Patented June 8, 1943

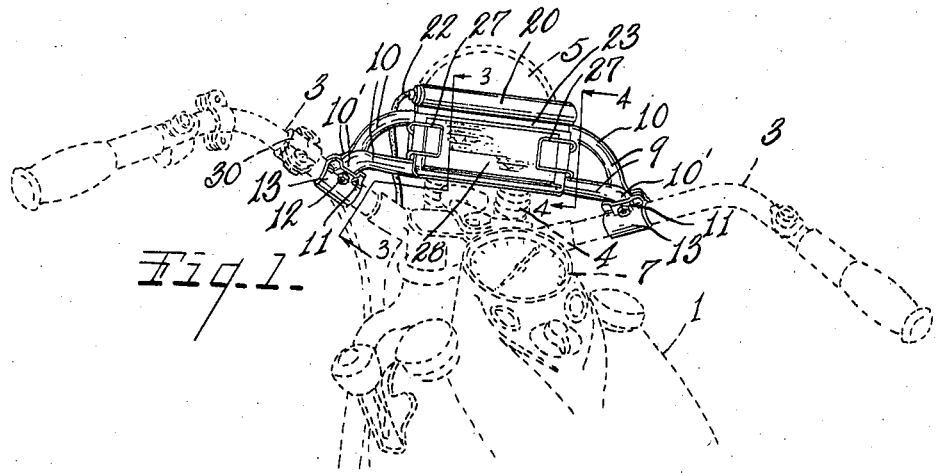
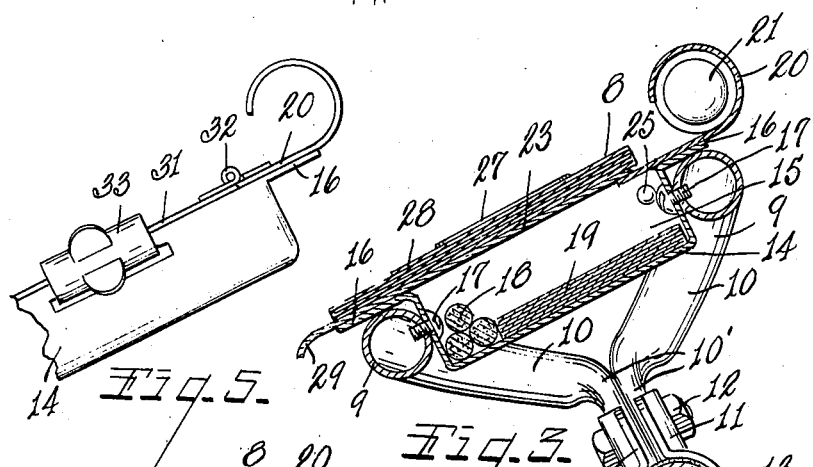
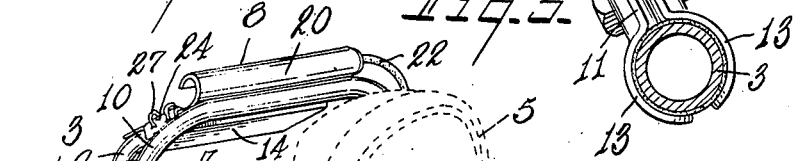
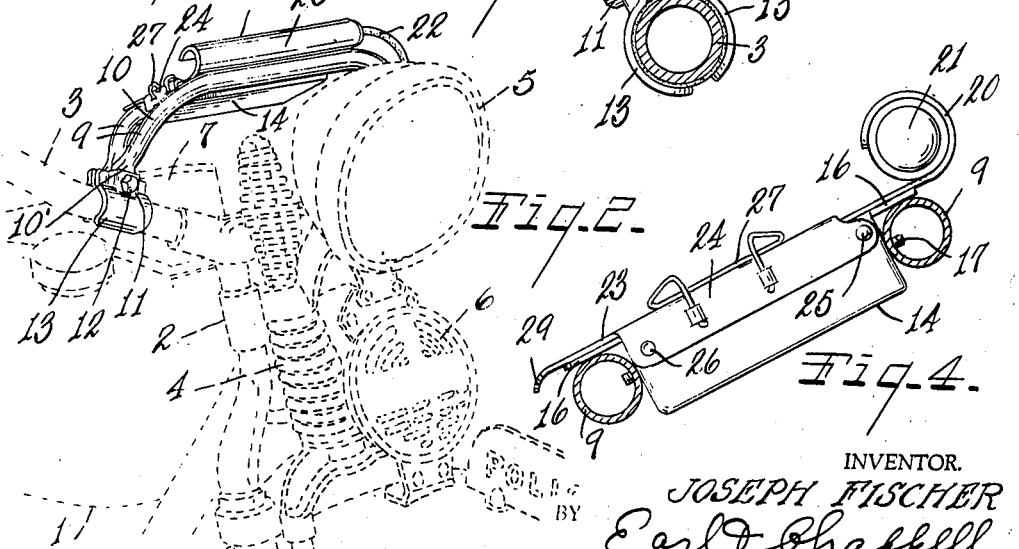

2,321,192

UNITED STATES PATENT OFFICE 2,321,192

MOTORCYCLE PAD HOLDER

Joseph Fischer, Grand Rapids, Mich.

Application May 31, 1941, Serial No. 396,107

2 Claims. (Cl. 224—36)

The main objects of my invention are:

First, to provide an improved holder for writing pads, maps, lists and the like having provision for mounting the same on the handlebars of a motorcycle whereby to position the pad, map or other information sheet in a convenient position for use.

Second, to provide a holder of the type described which is located in such manner as to be shielded from undue draft, hence not subject to looseness and fluttering when the motorcycle is driven at high speed.

Third, to provide a combined holder and receptacle adapted to contain pencils, maps, cards, memorandum slips or sheets and like miscellaneous articles such are utilized by motorcycle policemen in the performance of their duties.

Fourth, to provide a holder device of the type described having means for mounting the same on the handlebars of the motorcycle in such manner as to be free from excessive vibration which would render difficult to read or effectively use the object supported by the holder.

Fifth, to provide a device of the foregoing character which is attractive in appearance, presents no hazardous source of personal injury to the operator of the motorcycle, which is conveniently located in the forward line of vision of the rider so as to be capable of being conveniently viewed without excessive turning of the head, which is comparatively vibrationless and moves or shifts but little when the motorcycle handlebars are turned, and which has other important advantages.

Further objects relating to details and economies of my invention will appear from the description to follow. The invention is defined in the claims.

This invention relates to an improved combined pad or sheet holder and receptacle for motorcycles, particularly those operated by motorcycle highway patrolmen. Such persons have an urgent need for a holder adapted to support a pad, map, list, chart or the like where it will be convenient for use and viewing without excessive turning or shifting of the head and at the same time not interfere with or obstruct the operation or view of any of the other equipment ordinarily found on motorcycles. I am aware that there has heretofore been in use a pad holder which is attached to one side of the handlebar adjacent the end thereof, however that type of holder is unsatisfactory inasmuch as, being located remote from the connection of the bar to the supporting wheel fork or steering post therefor, it is subject to excessive vibration which makes it practically impossible to write thereon or to read anything written or printed thereon. Moreover such devices, by reason of their location, traverse a large arc when the wheel is turned, making the pad difficult to follow with the eye, and even when the cycle is driven straight it requires a substantial turning movement of the head from side to side to glance at the pad then back to the machine instruments, which are straight ahead of the driver in his normal line of view. They are further subject to the objection of being completely exposed to the stream of air when the vehicle is being operated at high speed which displaces the sheets thereof unless they are held down very tightly, and they are an ever-present source of possible personal injury to the operator. I am aware of several cases in which policemen have suffered cuts, particularly about the wrist, inflicted by such devices when falls from the motorcycles are experienced.

The present device eliminates all of these objections and, moreover, is attractive in appearance and conceals various unsightly equipment of the motorcycle, such as the front wheel suspension springs etc. By reason of its location it can be made of ample size for easy reading and writing and it affords a comparatively large compartment space for storage of various articles such as pencils, cards, maps, lists of stolen cars and the like such as motorcycle policemen are called upon to have avialable at all times.

A structure embodying the features of my invention is illustrated in the accompanying drawing, wherein:

Fig. 1 is a perspective view of the device of my invention mounted on a well known type of motorcycle, illustrating the operative relation thereof to the vehicle and various conventional equipment with which the latter is ordinarily provided, such parts being shown by dotted lines.

Fig. 2 is a perspective view from the front of the motorcycle further illustrating the construction and arrangement of the device of my invention with relation to the cycle and equipment thereof.

Figs. 3 and 4 are enlarged views in section on lines corresponding to lines 3—3 and 4—4, respectively, of Fig. 1, and Fig. 5 is an enlarged fragmentary view in side elevation illustrating an alternative embodiment of the holder device contemplated by my invention.

Referring to the drawing, the reference numeral 1 in general indicates a motorcycle of well known type, it being understood that the device of my invention is readily adaptable to practically any make of machine in a few minutes time. This machine has the usual forged steering fork 2 on which the outwardly and upwardly diverging handlebars 3 are mounted and is provided with a front wheel spring suspension 4 which is entirely conventional in nature.

The reference numerals 5, 6, respectively, designate the spotlight and horn of the vehicle which are mounted centrally thereon in the usual fashion. Referring to Fig. 1 the speedometer and certain control instruments which are mounted rearwardly and also centrally of the handlebars on the body of the machine are designated generally by the reference numeral 7. The combined pad or sheet holder and receptacle of my invention is indicated generally by the reference numeral 8 and consists of a pair of upwardly bowed tubular supporting bars 9 which diverge relative to one another in the front to rear direction as clearly illustrated in the drawing. These rods are preferably made of tubular stock because of its lightness and rigidity, however it will be appreciated that if desired they may be formed of any suitable rod stock. The downturned extremities 10 of the supporting bars 9 are flattened and bent outwardly relative to the intermediate bowed portions so as to provide terminal ears 10' which lie side by side when said portions are in their upwardly divergent relation as illustrated in Fig. 3. Each pair of ears 10' has the coacting clamp members 11 pivotally attached thereto by a bolt and nut 12, the clamps terminating in the approximately semicircular clips or jaws 13 adapted to engage the handelbars 3 of the machine at opposite sides of the steering post, as illustrated in Fig. 1. A suitable yielding shim, cushion, or tape may be interposed between the clamp jaws 13 and the handelbar to improve the effectiveness of the grip on the latter and to prevent marring or scratching.

It will be understood that the pivotally mounting of clips or jaws 12 on the supporting bars 9 enables the angularity of the jaws to be adjusted as desired for mounting the device on different types of motorcycle handle bars, likewise that by loosening the jaws somewhat the device may be tiltably adjusted forwardly or rearwardly as desired to suit the individual need of the operator.

Mounted on these supporting bars 9 is the combined pad or chart holder and receptacle 14 which, in the illustrated embodiment, is fabricated of a sheet metal box-like member stamped to provide an open top compartment or recess 15 and the peripheral outturned flange 16. This member provides a receptacle of substantial size, as well as a base for the pad support, and can be readily and cheaply fabricated by a conventional die stamping or bending and soldering process. It is interposed between the two supporting bars 9 with the flange 16 resting on the top surface thereof, and it is secured to these bars by the screws 17 which are threaded into appropriate tapped holes formed on the adjacent surfaces of the bars. The box 15 serves as a receptacle for pencils 18, cards, charts, maps, memorandum slips or the like, indicated by the reference numeral 19, or any other similar paraphernalia such as motorcycle policemen or other motorcyclists in general might find it necessary to have available.

On the front flange of the receptacle 15 is secured, as by soldering or spot welding, a forwardly and upwardly curved generally circular sheet metal wind shield and lamp reflector fitting 20 which may be silvered or enameled on its inner surface to serve as a reflector for the electric light bulb 21, the latter and its socket being held in the reflector by a sliding fit in fitting 20. The cord 22 for the light is appropriately connected to the source of electrical energy of the machine.

Receptacle 15 is covered by a closure plate 23 having downturned side wings 24 extending around either side of the receptacle and pivoted thereto at a pivot point 25 adjacent the front of the receptacle. Suitable coacting projections and recesses, generally designated 26, may be provided on the side wing of the cover and the adjacent side of the receptacle to serve as detent means for maintaining the cover in closed position. Wings 24 also serve as supports for the spring clips 27, these clips being employed to hold the pad, chart, map or the like, indicated by the reference numeral 28, in place. It will be noted that the closure 23 terminates at its rear edge in a downturned lip 29 which may be engaged by the operator's finger to elevate the closure for access to the interior of the receptacle.

From the foregoing it will be apparent that I have provided a motorcycle attachment which is of great utility. The pad holder, located as it is immediately behind the headlight 5 and in front of the rider, is in a dead air space, i. e., the headlight deflects the air stream above and to the sides of the holder, while the pressure built up ahead of the rider's body counteracts and nullifies eddy currents rearwardly of the holder. I have tested a practical embodiment of my invention at high speeds and find that there is practically no flutter or loosening of papers supported on the top of the holder. Likewise, the stability of the double bar support, rigidly secured as it is to the handle bars 3 closely adjacent their connection to the fork eliminates vibration, so that it is easy to read small type printing matter on the pad, chart, list or the like, and equally easy to write on the pad. This is true either in daylight or when the article is illuminated by lamp 21. In the latter case the reflector directs the illumination over the surface of the holder and shields the rider's eyes therefrom.

This convenience and ease of use is still further contributed to by the fact that the holder being over the axis of turning of the wheel fork, has a relatively limited pivoting or swinging movement when the cycle is turned, as compared to the movement of a member attached farther out on either one of the handlebars. The device is further characterized by its compactness and the small space it occupies on the machine. Thus, there is ample room left on one of the handlebars for attachment of a radio loud speaker, as by means of a bracket or clamp 30, see Fig. 1. The device of my invention tends to conceal the unsightly spring mounting 4 for the front wheel and thus adds substantially to the appearance of the machine.

A simple flip of the wrist is all that is necessary to elevate the closure 23 and permit access to the receptacle or compartment beneath, during which displacement of articles on top of the closure is prevented by the clips 27.

It will be evident that the particular nature of certain of the parts of the device can readily be altered. Thus, in Fig. 5 I illustrate a slightly modified embodiment wherein the closure or top for the receptacle, indicated by reference numeral 31, is pivoted by means of a hinge 32 on the top of the receptacle, the hinge being secured, for example, to the top of the curved light reflector fitting 20. In this embodiment the side edges of the closure 31 are extended sidewise parallel to and over the flange 16 of the receptacle and the separate manually operable clips 33 of a well known spring type are employed for coaction with the flange and closure edges, likewise with articles supported on top of the closure, to maintain the closure in place and simultaneously prevent displacement of the articles. Modifications of this type will readily suggest themselves, hence I desire that the invention be not regarded as unduly limited in this respect.

In either of the foregoing embodiments the driver of the motorcycle is provided with a convenient support for riding and reading while operating the vehicle, it being unnecessary to withdraw his eyes from the normal line of vision for this purpose. Therefore, attention may be paid to the instruments 7 as well as the pad and the roadway ahead with a minimum of difficulty. Moreover, the driver is protected from certain injuries which have been inflicted in the past by the other types of pad or sheet holders consequent to falls from the vehicle. The device is proof against jiggling due to vibration, and is in all respects of a sturdy permanent construction and well adapted to operate effectively throughout the life of the motorcycle.

In the foregoing description reference has been made to certain particular types of combined receptacles and pad holders, however I desire it to be understood that the invention is not unduly restricted to the character of the holder elements which are supported by the bridge-like supporting bar arrangement 9, and that it is the provisions for supporting the holder on the machine so that it is free from the above discussed objections previously found in pad or other supports which essentially characterize the present invention, even though the particular type of combined receptacle and pad holder is to my knowledge likewise novel with me.

Embodiments of the invention which incorporate the principles of the invention in a highly desirable manner have been illustrated and described. It should be understood that the foregoing terminology is used descriptively rather than in a limiting sense, and with full intention to include equivalents of the features shown and described, within the scope of the following claims.

Having thus described my invention, what I claim as new and desire to secure by Letters Patent is:

1. In combination with a motorcycle or like vehicle provided with steering handlebars, a pad holder for various articles, and a support for said holder to which the same is secured, comprising an elongated bridge-like member secured rigidly to said handlebars on opposite sides of the center of the motorcycle, whereby said holder is disposed in the forward line of vision of the rider and rearwardly of the headlamp and other equipment of the motorcycle, in which position swinging movement thereof when the motorcycle is turned is reduced to a minimum, said holder having means for securing articles thereon, said holder having a wind shield near the forward end thereof extending substantially from side to side of said holder and for a substantial distance above the upper surface of the holder.

2. In combination with a motorcycle or like vehicle provided with steering handlebars, a holder for various articles, and a support for said holder to which the latter is secured, comprising a bridge-like, elongated member having clamps on the ends thereof rigidly engageable with the handlebars on opposite sides of the center of the motorcycle, whereby said holder is disposed in the forward line of vision of the rider and rearwardly of the headlamp and other equipment of the motorcycle, in which position swinging movement thereof when the motorcycle is turned is reduced to a minimum, said elongated member having an upwardly bowed central portion to which said holder is secured.

JOSEPH FISCHER.